United States Patent [19]

Olsson

[11] 4,188,142
[45] Feb. 12, 1980

[54] LOCKABLE SWIVEL COUPLING

[76] Inventor: Hans O. Olsson, Krondikesvagen 42B, Ostersund, Sweden, 831 00

[21] Appl. No.: 956,729

[22] Filed: Nov. 1, 1978

[30] Foreign Application Priority Data

Nov. 9, 1977 [SE] Sweden ............................. 77126480

[51] Int. Cl.² ............................................. F16D 3/80
[52] U.S. Cl. ...................................... 403/31; 403/370; 192/88 B; 188/367
[58] Field of Search ................ 403/15, 31, 370, 164, 403/165, 103; 192/88 B; 188/74, 367

[56] References Cited

U.S. PATENT DOCUMENTS

| 2,205,521 | 6/1940 | Fawick | 188/367 |
| 2,712,248 | 7/1955 | Gustafson | 77/63 |
| 3,595,555 | 7/1971 | Cameron | 269/20 |
| 3,804,221 | 4/1974 | Valantin | 192/88 B |
| 3,838,938 | 10/1974 | Witzig et al. | 188/367 X |
| 3,994,604 | 11/1976 | Visser | 403/15 |
| 4,011,019 | 3/1977 | McDonald et al. | 403/15 |
| 4,093,052 | 6/1978 | Falk | 192/88 B |

FOREIGN PATENT DOCUMENTS

| 1409430 | 7/1965 | France | 403/31 |
| 1400966 | 7/1975 | United Kingdom | 403/31 |

Primary Examiner—Wayne L. Shedd
Attorney, Agent, or Firm—Christie, Parker & Hale

[57] ABSTRACT

A swivel joint comprises a journal fitted in a hole. The journal is conical and axially formlocked in the hole. A working chamber is arranged behind one of the mantle surfaces of the hole and the journal. The chamber has an integral flexible wall defining one of said surfaces. When hydraulic pressure is applied to the chamber, the flexible wall expands the journal is centered in the hole and locked against rotation, and the journal end engages the hole bottom.

6 Claims, 4 Drawing Figures

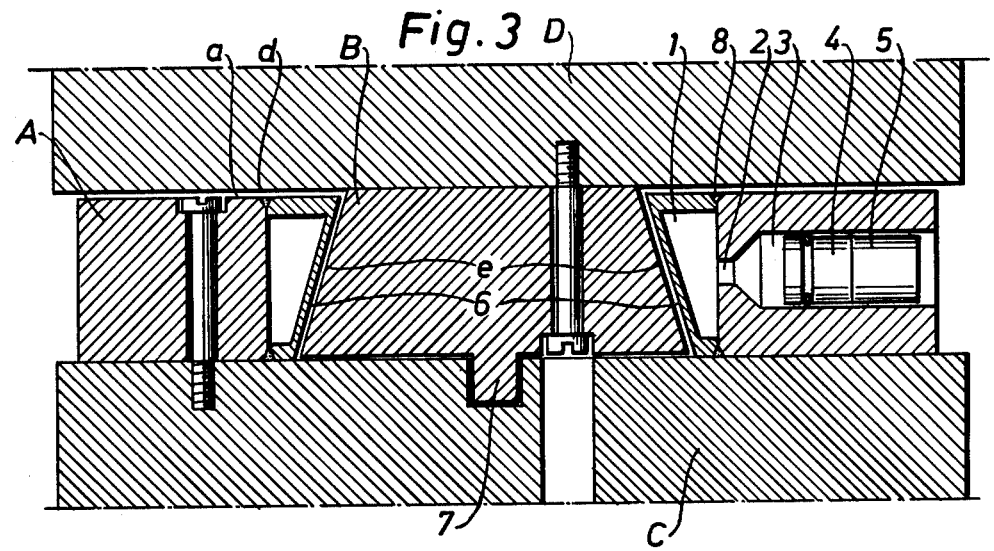
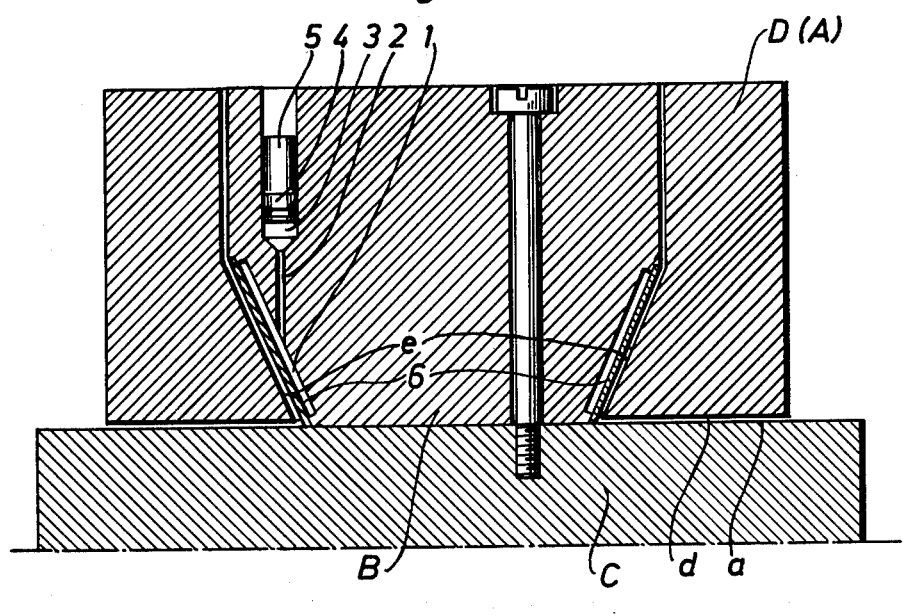

LOCKABLE SWIVEL COUPLING

The present invention refers to a lockable swivel coupling comprising two machine elements, a journal means on one of the elements, a hole means in the other of the elements, receiving the journal means, the journal means and the hole means having rotational-symmetric complementary gliding surfaces forming a guide for swivelling motion between the two elements about a swivelling axis which also constitutes a common axis for the hole means and the journal means, and locking means for rigidly locking the elements in different swivelling positions.

In mechanical devices such as swivelable tool mountings, vices and swivelable work tables in machine tools, very great demands are made on being able to lock the swivelable part of the mechanical device with very accurately maintained angular attitude during the locking operation, after setting in different angular attitudes, simultaneously as the locked part of the device must also assume a very well defined position in the direction of the swivelling axis.

Perhaps the most usual way up to now of locking both elements to each other after angular adjustment, is that the swivelable part of the device has a cylindrical part, e.g. a journal, which fits with great exactitude into a cylindrical hole in the part of the device which is fixed, and about the center of which swivelling takes place, and that locking is achieved by means of screws or screwed joints of a conventional kind, which are tightened with great force to lock the swivelable part to the fixed part, the latter being, for example, the foot or bottom plate of a vice, part of a machine frame or the like.

The greatest disadvantage with the above-mentioned device or other devices now used for this purpose, is that the angular adjustment which has been made is easily disturbed during locking, which must often take place by tightening up one or more screws with great force.

If locking is done by tightening screws which go through the movable part of the device to grip tightly in the fixed part of the device, and thereby urge a planar surface of the movable device against a planar surface in the fixed device, it will be easily appreciated that there is an uneven pressure on the two surfaces which are urged against each other, since the pressure will be greatest about the areas lying closest to the screws. There occurs hereby a certain amount of local deformation of the surfaces about these areas, said deformation by degrees affecting the possibility of accurate angular setting. If locking takes place by applying some form of screwed joint directly onto the rotationally symmetric parts about which swivelling takes place e.g. of the principle type used in so-called hose clamps, experience clearly shows that there is an uneven pressure distribution on the rotationally symmetric parts, these parts being locally deformed, which similarly has the result of making an accurate angular setting more difficult.

The present invention, which is more closely characterized in the appended patent claims, relates to a device by means of which the above-mentioned disadvantages are circumvented in a simple way. The invention is based on the principle that locking in the different set angular positions shall be provided by means of radially and axially directed braking forces evenly distributed round the whole of the periphery of the complementary engaging surfaces of the rotationally symmetric parts. According to the invention, these braking forces are provided by making the mantle surfaces conical and utilizing the principle of a hydraulic locking means known per se, by arranging its working chamber behind one of the surfaces engaging against the other of the rotationally symmetric parts.

In the simplest embodiment, the rotationally symmetrical parts can be made as a conical hole with a conical shaft fitting therein. An embodiment comprising cylindrical hole and journal has, the disadvantages that increasing play can occur during repeated use, and that it will be possible with this design to provide a force simultaneously with the radially directed locking force and perpendicular thereto, for fixing both the machine elements in relation to each other.

Said disadvantages of the rotationally symmetric parts made as cylindrical shaft and hole are avoided by the invention, wherein the rotationally symmetrical details, instead of being cylindrical, are made as rotationally symmetrical truncated cones, at least for a portion of their axial extension, and the journal end abuts the hole bottom. The journal end and the hole bottom may extend in a normal plane to the swivelling axis or be conical.

The inventive division of the braking force into two components is automatically obtained by making conical the rotationally symmetrical surfaces pressed against each other for locking, and providing the locking force by urging one surface against the other, one component having the direction of the swivelling axis.

As already mentioned, the conical surfaces only need to be a portion of the axial extension of the rotationally symmetrical details. The rest can to advantage be cylindrical and serve as guide means. The working chamber will in this case only lie behind one of the conical surfaces engaging against the other, so that the cylindrical part is not exposed to any radial braking pressure causing wear. The main object of the last-mentioned embodiment is thus to separate the guiding function from the locking function, while at the same time maintaining the requirement that both functions shall operate symmetrically with relation to the swivelling axis.

The invention will now be described in detail in the following while referring to the appended drawings, which illustrate the invention in principle in the form of a sectional view through the common swivelling axis.

FIG. 3 is a cross-sectional view of a second alternate embodiment of the lockable swivel coupling of FIG. 1; and FIG. 4 is a cross-sectional view of a third alternate embodiment of the lockable swivel coupling of FIG. 1.

On the drawings, the same reference denotations refer to the same or corresponding details.

Figure 1:
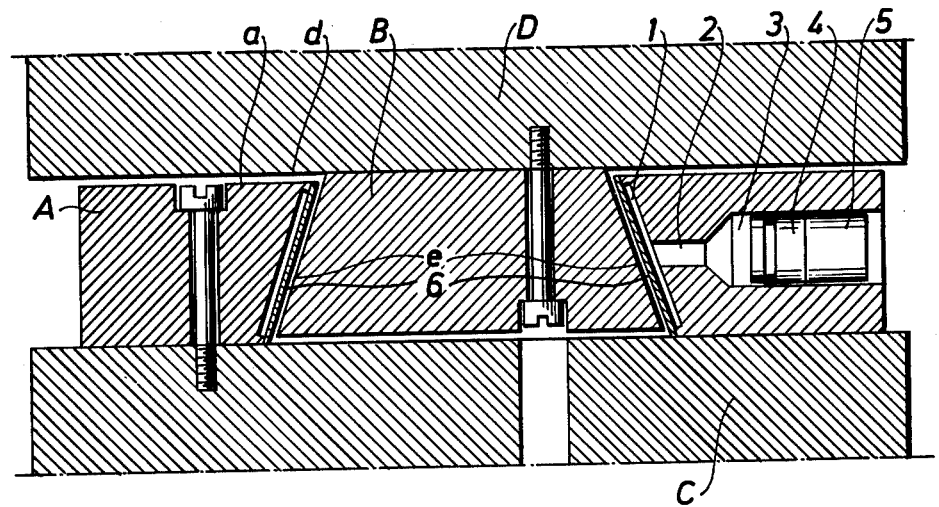
FIG. 1 is a cross-sectional view of one embodiment of a lockable swivel coupling according to principles of this invention.

The embodiment illustrated in FIG. 1 consists of two elements, swivelable relative to each other about a common axis. In the shown embodiment, one element consists of a plate A rigidly attached to a frame portion C, e.g. the foot of a vice, a work table or the like, and having a hole in the form of a truncated cone, the largest base surface of which is facing the frame portion of foot C. The other element D, which in this case is the one that is swivelable, is provided with a conical journal B fitting the conical hole of the plate A, and rigidly attached to the swivelable element D with its smallest base surface abutting thereto.

Inside the defining surface to the conical hole in the plate A, there is formed a working chamber 1, which via a shallow channel 2 is in communication with a pressure cylinder 3, said pressure cylinder being provided with a sealing means 4 and a pressure piston 5. The working chamber as well as the channel and pressure cylinder are completely filled with a hydraulic medium.

When the pressure piston 5 is displaced towards the left, a force on the conical wall element 6 occurs via the hydraulic medium, this force being equal to the force with which the pressure piston is pressed in, multiplied by the quotient between the portion of the total surface of the wall element 6, facing towards the hydraulic medium, and the cross-sectional area of the pressure piston. In a practical case, this quotient can easily be made to reach a factor of 100 or more.

The wall element 6 is thereby pressed against the surface e of the truncated cone B, and a frictional force is obtained between these surfaces which will be proportional to the force applied from outside and the surface relationships given in the paragraph above. Since the surfaces pressed against each other are conical, there is a force component in an axial direction which forces the surface a in the plate A against the surface d in the swivelable element D. The swivelable element will hereby engage against the frame part C with great pressure, there being also obtained a frictional force between the surfaces a and d, which further contributes to effective locking of the swivelable element to the frame part.

Since the force per unit of surface with which the wall element 6 and the surface e are pressed against each other is substantially constant over the surfaces, and since it is only necessary to apply a relatively small force on the piston 5, the elements can be locked against each other very heavily without risk of disturbing the set angular attitude.

Figure 2:
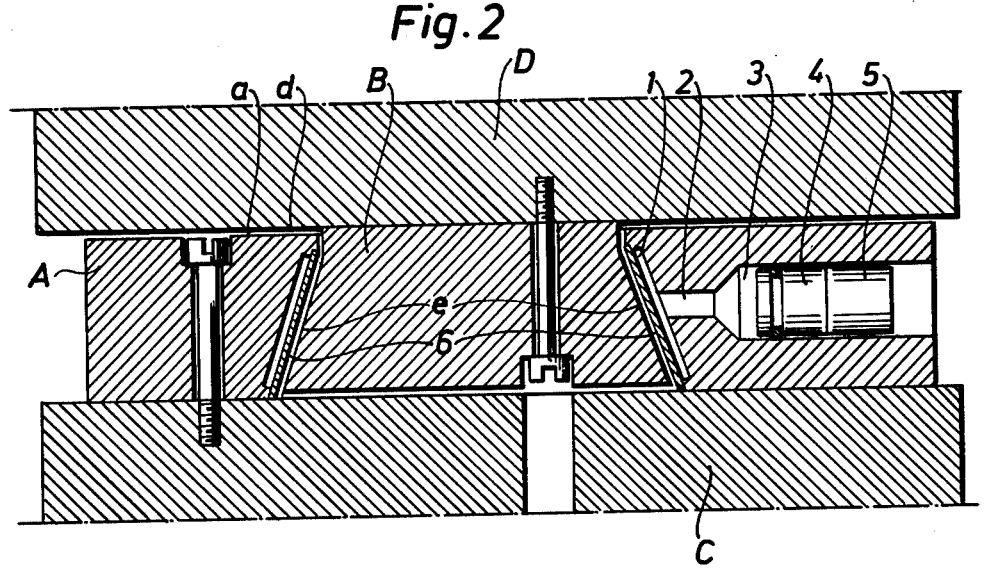
FIG. 2 is a cross-sectional view of an alternate embodiment of the lockable swivel coupling of FIG. 1.

The embodiment of the invention illustrated in FIG. 2 differs from that in FIG. 1 solely in that the journal and hole are conical for only a certain part of their axial extension. The rest of the journal and hole is cylindrical. The locking function which is provided between the conical surfaces is thereby separated from the guiding function which is provided in the cylindrical portions.

The embodiment of the invention illustrated in FIG. 3 differs from those according to FIGS. 1 and 2 in two respects. In the first place the locking function, as in FIG. 2, has been separated from the guiding function. According to FIG. 3, this has taken place, as distinct from FIG. 2, in that the truncated cone B has been provided with a cylindrical journal 7 fitting into a cylindrical hole in the frame portion C. The journal 7, as well as the cylindrical hole in which it fits, are naturally centered with relation to the common swivelling axis of the device.

The second respect in which the embodiment according to FIG. 3 differs from that according to FIGS. 1 and 2 is in the design of the working chamber. According to FIG. 3, only the one of the work chamber walls bordering on the conical surface has been made conical, while the opposite wall in the working chamber has been made cylindrical. Better conditions are hereby provided for a heavier weld 8, as well as the opportunity to make the weld outside the surfaces which are to engage or glide against each other.

In the embodiments described above and shown on the drawings, the hydraulic working chamber 1, and therewith coacting hydraulic systems 2–5, have been shown made in the plate A, in which the conical hole is made. According to the invention, it is naturally just as possible to make the work chamber inside the conical surface of the journal B, and connect a coacting hydraulic system to this working chamber.

In a corresponding way, a conical journal can naturally be attached to the foot, frame or work table, said journal coacting with an element constituting a part of the swivelable element and provided with a corresponding conical opening. This embodiment is illustrated in principle in FIG. 4. The working chamber and the hydraulic system coacting with it are in this case introduced into the element provided with the conical journal. The annular swivelable element can in this case be formed as a tool mounting, for example.

A condition for locking to take place in a reliable manner is that there is no leakage in the hydraulic system. It can therefore be expedient to make the piston acting in the pressure cylinder with a sealing means of the kind described in the Swedish patent application No. 7708034-9 of July 11, 1977. Such a sealing means comprises partly an O-ring fitted in an annular groove around the piston and sealing against the cylinder wall partly a compressible disk fitted on the inner end of the piston and having a small clearance to the cylinder wall. At low pressures the O-ring upholds the sealing function. At higher pressures the O-ring tends to fail due to the softness thereof necessary to maintain the sealing at low pressures. At those pressures for which the O-ring tends to fail the compressible disk is axially compressed in such an extent that the radial clearance to the cylinder wall is eliminated, whereby the O-ring seal is relieved and the disc takes over the sealing function at higher pressures.

The piston is preferably connected to the cylinder by means of a threaded joint, whereby the piston may be axially displaced by mannual rotation.

As indicated, the working chamber should be leak proof and the expandable wall C thereof should be made integral with the other walls of the chamber, which in turn should be integral. Preferably the chamber is formed by an annular recess in the hole wall or the journal wall, and a flexible cover plate welded to the recess rims. Preferably the chamber walls consist of steel.

What is claimed is:

1. In a lockable swivel coupling comprising two machine elements, a journal means on one of the elements, a hole means in the other of the elements, receiving the journal means, the journal means and the hole means having rotational-symmetric complementary gliding surfaces forming a guide for swivelling motion between the two elements about a swivelling axis which also constitutes a common axis for the hole means and the journal means, and locking means for rigidly locking the elements in different swivelling positions, the improvement comprising: that the complementary gliding surfaces are conical along at least part of their axial extensions; that the journal means has an end surface cooperating with a complementary bottom surface in the hole means, the journal means being axially form-locked in the hole means with small axial clearance; and the locking means comprises an integral leak-proof working chamber behind at least one of said conical surfaces, the end surface and the bottom surface, the chamber having a flexible wall defining said one surface, the working chamber communicating with a hydraulic pressure source, whereby a hydraulic pressurization of the chamber causes a rigid locking of the elements against swivelling relative to each other with retained angular attitude and a precise axial positioning of the elements relative to each other.

2. A lockable swivel coupling as set forth in claim 1 wherein the working chamber is arranged behind one of the conical surfaces.

3. A lockable swivel coupling as set forth in claim 1 wherein the hole means and the journal means are conical along part of their axial extension and are cylindrical along another part of their axial extension.

4. A lockable coupling as set forth in claim 1 wherein the second surfaces are rotatable symmetrical and conical.

5. A lockable coupling as set forth in claim 1 wherein the second surfaces extend in a normal plane to the common axis.

6. A lockable coupling as set forth in claim 1 wherein the working chamber communicates with a cylinder having a plunger, the chamber and the cylinder being completely filled with a hydraulic fluid, and the plunger being axially threadable in the cylinder and constituting the hydraulic pressure source.

* * * * *